United States Patent [19]

Berringan et al.

[11] Patent Number: 5,256,466
[45] Date of Patent: Oct. 26, 1993

[54] ARTICLE FOR LIQUID CONTAINMENT AND RECOVERY

[75] Inventors: Michael R. Berringan, Oakdale; Harold J. Seppala, St. Paul, both of Minn.

[73] Assignee: Minnesota Mining and Manufacturing Company, St. Paul, Minn.

[21] Appl. No.: 876,394

[22] Filed: Apr. 30, 1992

[51] Int. Cl.$^5$ .............................................. B32B 3/06
[52] U.S. Cl. ................................... 428/166; 428/129; 428/284; 428/286; 428/190; 428/515; 428/398; 428/36.1; 428/224; 428/240; 428/283; 428/327; 428/340; 428/365; 428/372; 428/376; 210/502.1; 210/69.1; 210/924
[58] Field of Search ............... 428/224, 283, 293, 326, 428/364, 372, 403, 129, 166, 284, 286, 190, 240, 327; 210/484, 660, 690, 689

[56] References Cited

U.S. PATENT DOCUMENTS

| | | | |
|---|---|---|---|
| 4,659,478 | 4/1987 | Stapelfeld et al. | 210/690 |
| 4,775,473 | 10/1988 | Johnson et al. | 210/484 |
| 4,792,399 | 12/1988 | Haney et al. | 210/484 |
| 4,813,948 | 3/1989 | Insley et al. | 604/366 |
| 4,840,734 | 6/1989 | Johnson | 210/660 |
| 4,933,229 | 6/1990 | Insley et al. | 428/224 |
| 4,965,129 | 10/1990 | Bair et al. | 428/398 |
| 5,080,956 | 1/1992 | Smith | 428/166 |

OTHER PUBLICATIONS

3M Product Bulletin No. 70-0704-0625-4(227.5)DPI, "Maintenance Sorbents" van Wente, "Superfine Thermoplastic Fibers", *Industrial Engineering Chemistry*, vol. 48, pp. 1342 et. seq. (1956).

Report No. 4364, Naval Research Laboratories, May 25, 1954, by van Wente, A. Boone, C. D., and Fluharty, E. L., "Manufacture of Superfine Organic Fibers".

*Primary Examiner*—Patrick J. Ryan
*Assistant Examiner*—Richard P. Weisberger
*Attorney, Agent, or Firm*—Gary L. Griswold; Walter N. Kirn; Carole Truesdale

[57] ABSTRACT

The present invention provides a liquid sorbent article comprising at least two contiguous layers formed from a single sheet, said layers being joined at a fold in said sheet and being intermittently releasably bonded together.

14 Claims, 3 Drawing Sheets

ARTICLE FOR LIQUID CONTAINMENT AND RECOVERY

FIELD OF THE INVENTION

The present invention relates to articles for containment and management of liquid spills and particularly to articles for containment, removal and recovery of liquid spills encountered in a manufacturing environment.

BACKGROUND OF THE INVENTION

A variety of materials, delivered in numerous configurations, have been used for the management of liquid spills in manufacturing environments. These materials include granular absorbents, sheet and roll goods, and boom configurations consisting of a casing filled with particulate sorbent products such as clay, cellulose, chopped corn cobs, or chopped microfibrous materials. Several types of sorbent products are typically used at location because no one sorbent product is adaptable to the many spill situations encountered in a manufacturing environment.

Historically, loose granular clay particles have been the principal material used for spill management activities in a manufacturing environment. Clay particles were preferred because they were economical, capable of sorbing both oil or water based spills, easily applied to a spill and readily adaptable to a variety of situations such as spills on irregular surfaces or in minimal clearance situations (i.e., under machines). In spite of these advantages, clay particles have disadvantages in that they are easily tracked to locations adjacent the spill site and the cleanup operation is labor intensive, requiring brooms, shovels, dustpans and a variety of containment vessels.

The use of loose granular materials has been declining with the introduction of "dimensioned" sorbent articles, i.e., sheets or rolls of sorbent materials or booms consisting of porous casings which are filled with loose granular sorbent materials. Dimensioned sorbent articles offer the convenience of easy placement, the ability to deliver a larger mass of sorbent material to the spill site in a smaller volume than would be required with loose materials, less mess than loose granular materials and a cleanup that is considerably less labor intensive than with loose granular materials.

The liquid holding capacity of sorbent articles used in spill management activities is an important factor in the selection of sorbent articles as it is desirable to contain, remove and recover spilled liquids using the minimum amount of sorbent material. Equally important, however, is the rate at which the sorbent article picks up or sorbs the liquid spill. Rapid, high capacity pickup of a liquid spill provides improved safety and higher productivity in a manufacturing environment by reducing exposure to the spill and the time required for spill management activities.

U.S. Pat. No. 4,965,129 (Bair et al.) discloses a sausage-shaped liquid-absorbing article which includes within a porous fabric, fine, fibrous particles of flash spun polyethylene, optionally particles of foamed organic polymer, and an effective amount of a wetting agent. The article is capable of absorbing oils or aqueous liquids in amounts equal to at least six times the weight of the particles.

U.S. Pat. No. 4,792,399 (Haney et. al.) describes a liquid collecting and retaining device consisting of a tubular, triangular shaped casing of a material which is permeable to liquids, which is partially filled with a material that collects and retains liquids passing through the casing, and which is incapable of itself passing through the casing.

U.S. Pat. No. 4,840,734 (Johnson) discloses a product for absorbing liquid leaks and spills which includes at least one closed cell with a cell wall permeable to liquid. An inorganic, inert absorbent is enclosed within the cell. Liquid contacting the product will pass through the cell wall and will be absorbed by the absorbent. A process for absorbing liquid leaks and spills is also provided.

U.S. Pat. No. 4,775,473 (Johnson et. al.) describes an absorbent article suitable for the absorption of aqueous as well as oleaginous liquids such as metal cutting fluids, hydraulic fluids, oils, and the like. The absorbent article is a spunlaced material sleeve closed at both ends and filled with an inherently flameproof particulate material, such as particulate clay material, having a certain particle size range. The spun laced material is liquid permeable, oleophilic and hydrophilic. The spunlaced material also has a liquid wicking rate that is at least equal to that of the particulate clay material contained within the sleeve. Preferred spunlaced materials are woodpulp/polyester spunlaced materials having a woodpulp-rich face and a polyester-rich face. The polyester-rich face is situated contiguous to the particulate absorbent material.

U.S. Pat. No. 4,659,478 (Stapelfeld) discloses an oil absorbing member and method which includes an elongate tubular member filled with a highly absorbent particulate material of capillary nature having a wicking action. The tubular member is closed at each end and can be arranged around a machine tool base as a continuous absorbing member.

In addition to the above referenced patents, there are a number of commercially available spill containment and recovery articles. For example, 3M Company, St. Paul, MN, sells a family of liquid sorbent articles designed to contain and recover liquid spills. These articles, which are based on sorbent microfibrous materials, include sheet goods for wiping and final cleanup operations, pillows designed for intermediate quantity liquid recovery, and booms, consisting of chopped microfibrous materials contained within an elongate casing having a substantially circular cross-section, which are used to contain and recover larger volume spills. These materials are described, for example, in 3M product bulletin "Maintenance Sorbents" No. 70-0704-0625-4(227.5) DPI.

SUMMARY OF THE INVENTION

The present invention provides a liquid sorbent article comprising at least two contiguous layers formed from a single sheet, said layers being joined at a fold in said sheet and being intermittently releasably bonded together.

The sorbent article preferably contains at least four layers, so that the article can be converted into alternative sorbent configurations by releasing the intermittent bonds and unfolding the structure. The sorbent article preferably comprises microfibrous sheet materials which may contain sorbent particulate material. Preferably, the sorbent article has a substantially rectangular shaped cross-section with a width to height ratio of about 10:1 to about 1:1 and is capable of sorbing at least seven times its own weight of light mineral oil over a period of 120 minutes.

Preferably, the liquid sorbent article has a sorbency ratio, SR, that can be predicted for the article such that $$SR = \sqrt[3]{T/V} \, (C^1 - C^2 H - C^3 W)$$

where SR is the sorbency ratio in grams liquid sorbed per gram sorbent;
T is the time in minutes for sorption;
V is the viscosity in centipoise of the fluid being sorbed;
H is the height in centimeters of the sorbent article;
W is the width of the sorbent article;
$C^1$ is a constant dependent on the permeability of the sorbent article;
$C^2$ is a geometric constant dependent on the height of the sorbent article; and
$C^3$ is a geometric constant dependent on the width of the sorbent article.

The constants for a specific sorbent article can be readily determined by testing for the sorbency rate of various thicknesses, e.g., three or more configurations, of sorbent material.

It has been found that for a given weight of a material, thinner sorbent material sorbs lower viscosity fluids more rapidly and thicker sorbent material sorbs higher viscosity fluids more rapidly. To overcome the need for maintaining various thicknesses of sorbent material for sorption of various viscosity fluids, it has been found that the folded sorbent article of the invention can be provided for sorption of various viscosity fluids, the folded configurations being suitable for higher viscosity fluids and the unfolded configurations being suitable for lower viscosity fluids. Thus, supply inventories necessary for optimum fluid sorption efficiency can generally be substantially reduced.

The form of the equation is determined by calculating slopes of sorbency ratio versus time and fluid viscosity holding the other variables constant. Once the form of the equation is determined, the coefficients were determined from the multiple regression of sorbency versus $$\sqrt[3]{T/V}$$

versus the other variables.

DETAILED DESCRIPTION OF THE INVENTION

It has surprisingly been discovered that a significant improvement in the rate of liquid uptake and the holding capacity of a sorbent article can be achieved by providing an appropriate configuration of the sorbent material to the liquid spill based on the viscosity of the liquid to be sorbed and sorption time. The impact of the shape of the sorbent article on the sorbency rate and holding capacity is especially evident with sorbent microfibrous sheet materials.

The sorbent articles of the present invention can be fabricated from sorbent sheet materials by folding the sheet materials to form layers and maintaining them in the layered configuration by intermittent releasable bonds. Preferably, the sorbent articles have a rectangular cross-section with a width to height ratio of about 10:1 to 1:1, more preferably about 5:1 to 3:1.

Figure 1:
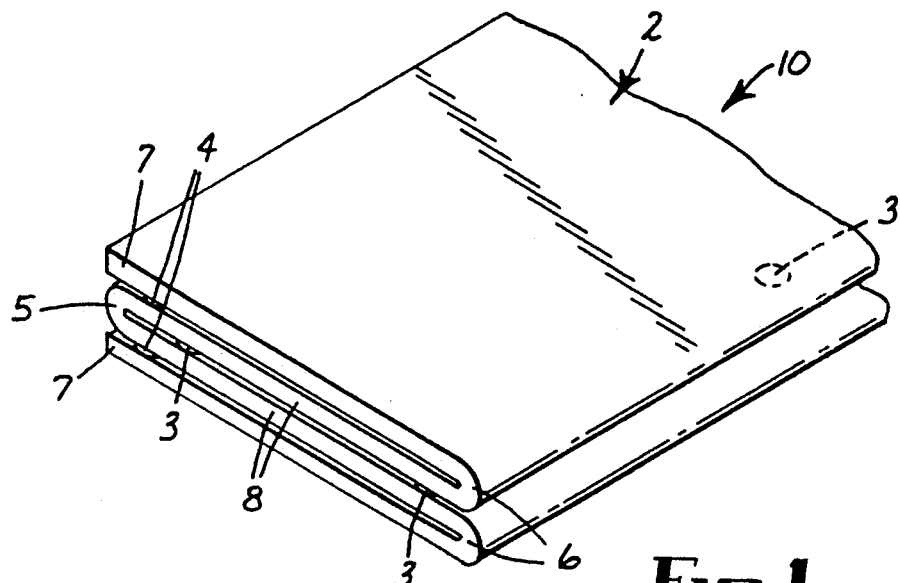
FIG. 1 is a perspective view of a four layer sorbent article according to the present invention.

FIG. 1 shows a four-layer folded construction of a sorbent article of the present invention having a "W" fold configuration. Sorbent article 10 is formed from microfibrous sheet material 2 which is folded along a central longitudinal fold 5 and two outer longitudinal folds 6 which run parallel to the central fold. The three folds cooperate to define two outer quadrants 7 and two central quadrants 8. An intermittent pattern 4 of a hot melt adhesive, for example, is applied between faces of adjacent outer and central quadrants of the microfibrous web and similarly an intermittent pattern 3 of hot melt adhesive is applied between faces of adjacent central quadrants to stabilize the layered microfibrous sheet material in a boom configuration which has a width to height ratio of about 3:1 or greater.

Figure 2:
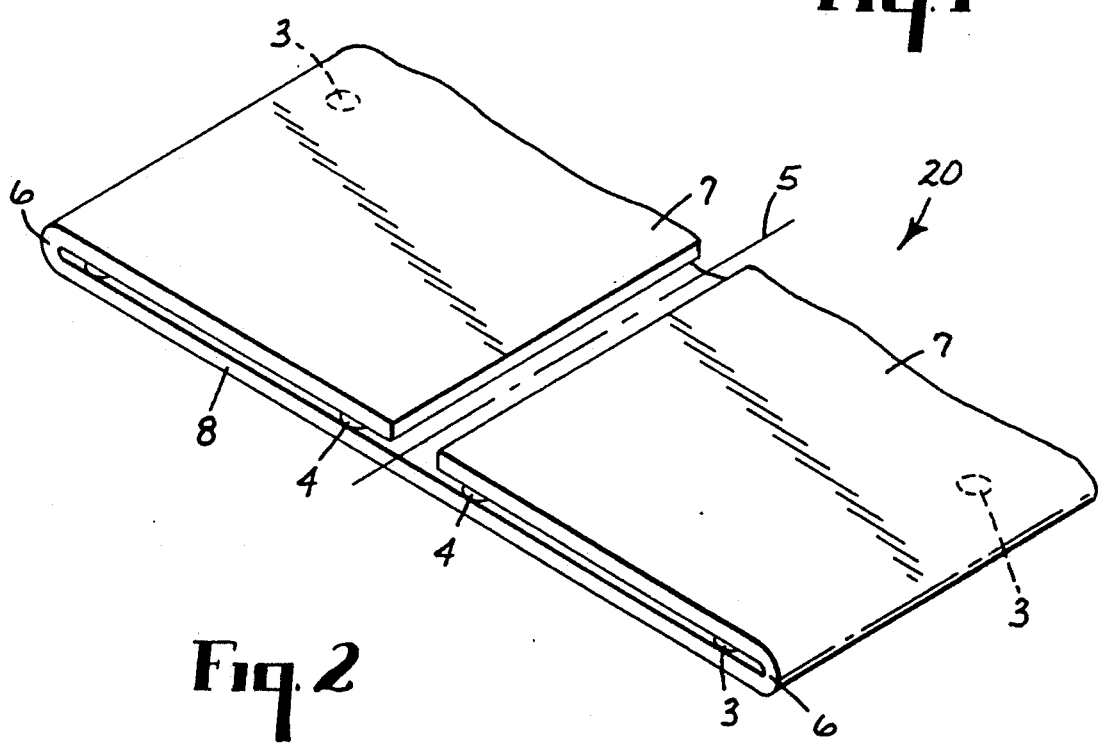
FIG. 2 is a perspective view of the article of partially opened.

FIG. 2 shows a four-layer article similar to article 10 of FIG. 1 except that stabilization between the central faces of the "W" configuration by hot melt adhesive pattern 3 has been broken by opening the boom along the central fold 5 to form an article 20. Article 20 has approximately twice the surface area and half the height of article 10.

Figure 3:
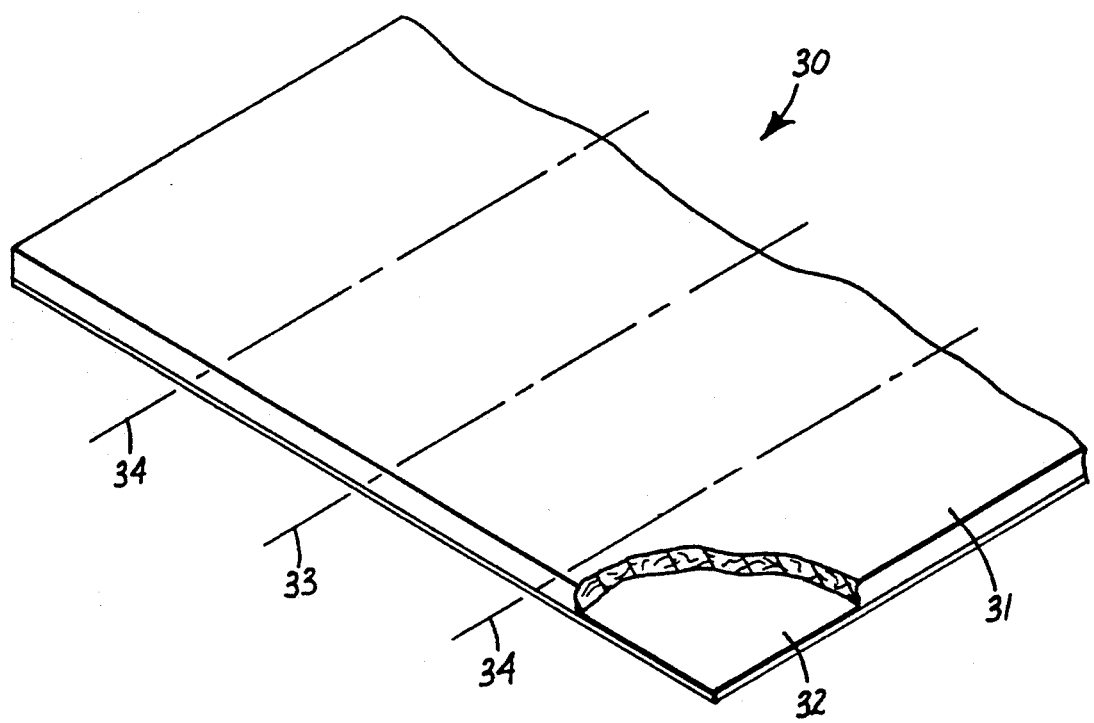
FIG. 3 is a schematic representation of a sheet material useful for preparing the sorbent articles of the present invention.

FIG. 3 shows an alternative configuration of microfibrous sheet material 30 used to prepare the sorbent articles of the present invention. In this configuration, the microfibrous web 31 has a porous scrim facing material 32 coextensively attached to one face of the web, central longitudinal fold line 33 and outer longitudinal fold lines 34 which run parallel to central fold line 33.

Figure 4:
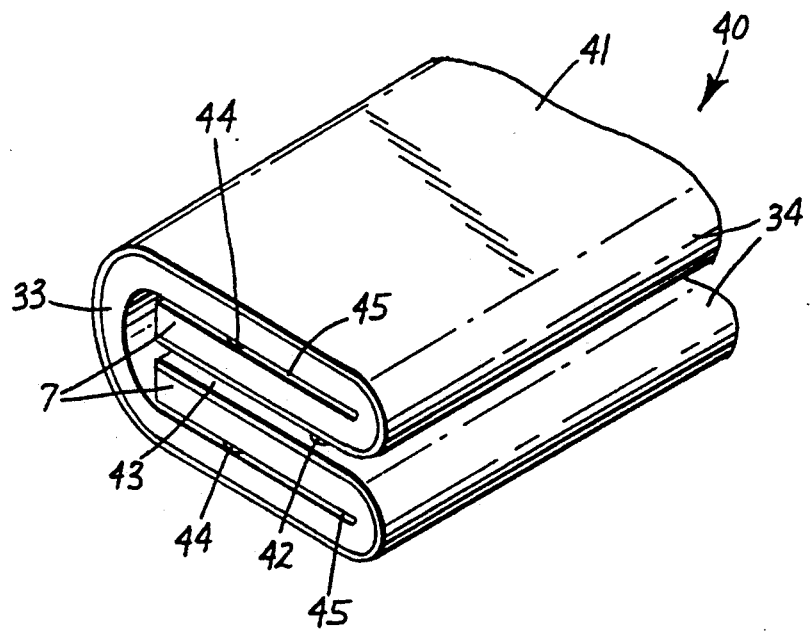
FIG. 4 is a perspective view of a four layer sorbent article according to the present invention prepared from the material shown in FIG. 3.

FIG. 4 is an alternative four-layer fold construction 40 having a configuration which, when made using a material such as that shown in FIG. 3, has a casing-like cover 41. To produce this configuration, outer quadrants 7 of microfibrous sheet material 30 are folded inwardly, i.e., toward the face of the material not having the scrim, along outer longitudinal fold lines 34 to form minor folds followed by folding the sheet again, along central fold line 33 to form a major fold, to produce the configuration shown. The sorbent article is stabilized in the folded configuration by application of an intermittent pattern 42 of, for example, hot melt adhesive applied to adjacent scrim covered interior faces 43 of the folded structure. The use of a single stabilizing adhesive pattern affords a faster assembly for the articles of the invention while still providing the latitude of multiple sorptive body configurations. Optionally, two intermittent patterns of adhesive 44 may be applied to the interior, non-scrim covered face 45 of the microfibrous sheet material prior to folding along the central fold line 33 to provide additional stabilization for the article when it is opened to form a two-layer configuration.

Figure 5:
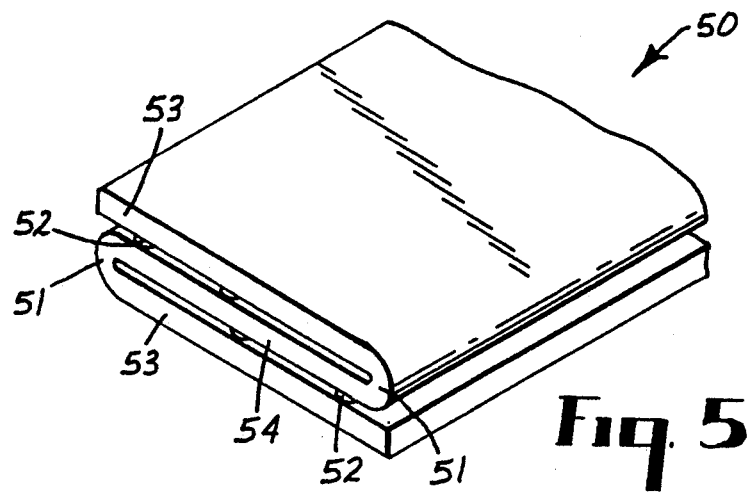
FIG. 5 is a perspective view of a three layer sorbent article of the present invention.

FIG. 5 shows a three-layer folded article 50 which has a "Z" configuration. Microfibrous sheet material has folds 51 to form outer layers 53 and inner layer 54. The configuration is stabilized by intermittent bonding 52.

Figure 6:
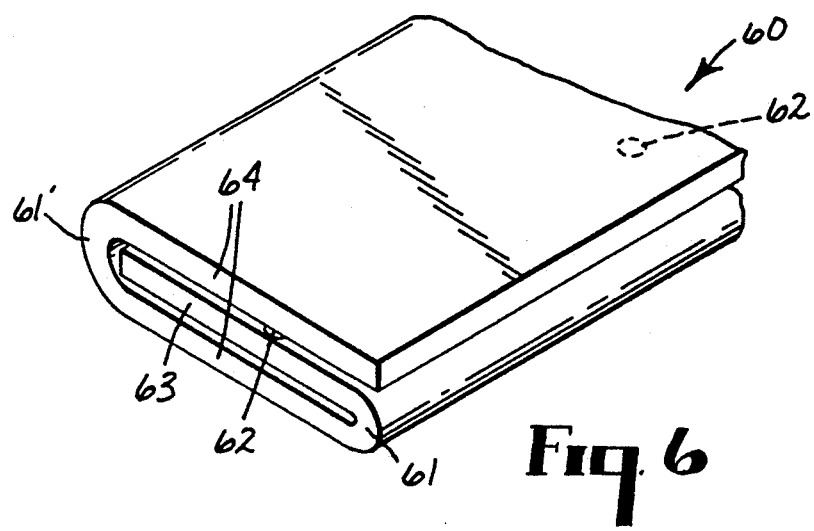
FIG. 6 is a perspective view of another three layer sorbent article of the present invention.

FIG. 6 shows an alternative three-layer sorbent article 60 having a "G" configuration. Microfibrous sheet material has folds 61, 61' to form outer layers 64 and inner layer 63. This configuration can be stabilized by a single intermittent pattern 62 of hot melt adhesive.

Figure 7:
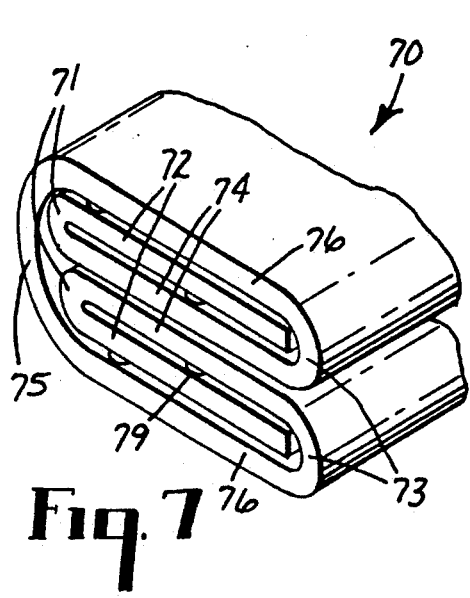
FIG. 7 is a perspective view of a six layer sorbent article of the present invention.

FIG. 7 shows a six-layer sorbent article 70. Microporous sheet material has folds 71 to form intermediate layers 72, folds 73 to form internal layers 74 and fold 75 to form outer layer 76, this configuration being stabilized by an intermittent pattern 79 of hot melt adhesive.

Figure 8:
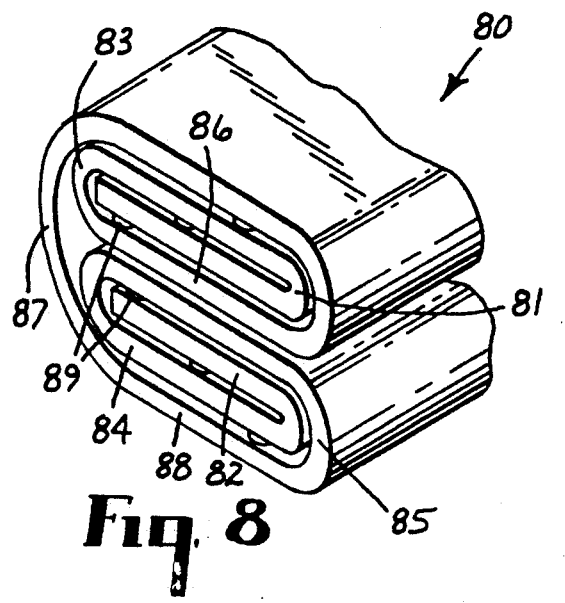
FIG. 8 is a perspective view of an eight layer sorbent article of the present invention.

FIG. 8 shows an eight-layer sorbent article 80. Microporous sheet material has folds 81 to form intermediate layers 82, folds 83 to form interjacent layers 84, folds 85 to form internal layers 86 and fold 87 to form outer layer 88, this configuration being stabilized by an intermittent pattern 89 of hot melt adhesive.

The articles of the present invention can be formed from any sorbent sheet material which can be folded and releasably bonded. Such sheet material include, for example, nonwoven webs such as microfibrous sheet material, and wood pulp based webs which are well-known to those skilled in the art.

The articles of the present invention are preferably formed from sorbent microfibrous sheet materials, particularly melt blown microfibrous materials. Such materials are described, for example, in van Wente, "Superfine Thermoplastic Fibers," Industrial Engineering Chemistry, vol. 48, pp. 1342 et seq. (1956), or in Report No. 4364, Naval Research Laboratories, May 25, 1954, "Manufacture of Superfine Organic Fibers" by van Wente, A., Boone, C. D., and Fluharty, E. L. are preferred for use in the sorbent articles of the present invention.

More preferably, the articles of the present invention are formed from melt blown microfibrous materials containing a surfactant topically applied or incorporated by direct addition of the surfactant to the molten polymer stream. Sorbent articles based on these materials are suitable for use on either oil or water based spills. Such materials having surfactant incorporated in the fiber are described in U.S. Pat. No. 4,933,229 (Insley et al.), which is incorporated herein by reference.

Most preferably, the articles of the invention are formed from melt blown microfiber webs which contain microfiber microwebs and crimped bulking staple fibers as described in U.S. Patent No. 4,813,948 (Insley) which is incorporated herein by reference.

Polymeric materials suitable for use in preparing the microfibrous sheet materials include, but are not limited to, polyolefins such as polyethylene and polypropylene and polyesters such as poly(ethylene terephthalate). The microfibrous sheet materials are preferable based on polyethylene, polypropylene, or blends of the two resins.

Other materials such as UV stabilizers, dyes, pigments, etc. can also be incorporated directly into the melt blown microfibrous sheet materials during the melt blowing process by blending the additive with the polymer prior to extrusion.

Articles of the present invention which are formed from melt blown microfibrous materials typically have sufficient strength, even when saturated with oil or an aqueous based liquid, that an outer facing is not required to maintain integrity. An optional outer facing may, however, be provided by applying a scrim material, for example, to the microfibrous sheet material prior to folding to improve the appearance of the article and coincidentally produce a more durable article. This can be accomplished by collecting the melt blown microfibrous material directly on the facing or alternatively bonding the facing to the microfibrous material by using an intermittent adhesive pattern or pin bond laminating the materials together. Facing material can also be applied to the microfibrous sheet material as a coating, for example, latex, at a level which does not substantially affect the sorbency of the microfibrous sheet material.

Scrim materials suitable for use in the preparation of the articles of the present invention preferably have a relatively open structure, such as obtainable with a nonwoven fabrics or open weave woven fabrics, so that they can be readily penetrated by both oil and aqueous based fluids. Additionally, suitable scrim materials are preferably chemically inert. Particularly preferred scrim materials include spunbond nonwoven polypropylene fabrics such as 0.5 oz./yd$^2$ CELESTRA, available from Fiberweb North America, Inc.

A variety of intermittent bonding means for providing releasable bonds are suitable for use in preparing the sorbent articles of the present invention. Suitable bonding means include, but are not limited to, hot melt or pressure sensitive adhesives, pressure sensitive tape pads, ultrasonic welding, pin bonding or mechanical bonding devices. Bonding of the folded sorbent article by means of an intermittent pattern of hot melt adhesives is preferred.

Regardless of the method of bonding, it is important that the area of the microfibrous sheet material contacted by the stabilization means be minimized so as to not negatively impact on the sorbency rate and liquid holding capacity of the finished article. Additionally, the bonding means should be selected such that adjacent layers of the microfibrous sheet material can be unfolded without imparting significant damage to the microfibrous sheet material. Preferably, the area of the microfibrous sheet material contacted by the bonding means does not exceed about 5%, more preferably about 1%, most preferably about 0.1%.

The sorbent articles of the present invention have excellent conformability, allowing them to readily adapt to changes in surface contour. This feature is particularly important in liquid containment situations where the liquid could flow under a sorbent article as a result of the article bridging undulations in surface contour rather than following the contour. Generally speaking, the conformability of the sorbent articles of the present invention is superior to the conformability of most commercially available sorbent articles having a boom-like configuration such as described in U.S. Pat. No. 4,840,734 and U.S. Pat. No. 4,792,399.

The conformability of the sorbent articles of the present invention readily allows the sorbent article to be formed into a variety of shapes to facilitate delivery of the articles from a delivery pack. For example, the sorbent article can be readily formed into a roll or fan-fold shape and placed in a dispenser box or container. In use, the desired length of sorbent article is simply unrolled or unfolded from the delivery pack and cut off. Alternatively, the roll or fan-fold could be perforated at regular intervals to provide convenient lengths. These delivery options stand in contrast to commercially available sorbent articles which are provided in a limited selection of lengths and widths. The limited size selection offered with most commercially available sorbent products can result in under utilization of the sorbent capacity of the article when a minimal spill situation is contained with a oversized sorbent article.

It has also become increasing more beneficial in spill management to separate the liquid spill material from the sorbent material or article so as to allow reuse of the fluid, segregation of the fluid for subsequent recovery operations and minimization of fluids in a landfill site. Separation or recovery is frequently accomplished by passing the fluid saturated sorbent articles through squeeze rollers. This technique is not suitable for use with most sorbent articles comprising porous casings filled with loose sorbent particulate materials. The squeezing action forces the loose particulates toward the end of the casing opposite the squeeze roller, rupturing the casing and scattering the sorbent particles. In contrast, the squeeze recovery process works very effectively with the sorbent articles of the present invention because the articles have a unified structure.

EXAMPLES 1-5

A melt blown microfiber web was prepared according to U.S. Pat. No. 4,933,229 (Insley et al.) with average fiber diameter of 6-8 μm, a basis weight of 300 g/m² and contained 8% by weight TRITON X-100, nonionic surfactant available from Rohm and Haas Company. The web was divellicated into microwebs which were then incorporated into a melt blown microfiber carrier web according to U.S. Pat. No. 4,813,948 (Insley). The carrier web contained 8% by weight TRITON X-100 surfactant as taught in U.S. Pat. No. 4,933,229 and 30% by weight of the microwebs. The sheet material had a basis weight of 244 gm/m², a density of 0.018 gm/cm³, a solidity of 2% and a thickness of 0.8 cm. The sheet material was formed into five sorbent articles, each having a cross-sectional area of 25 cm², a length of 20 cm and weight of approximately 25 g. The constants for the material for the Sorbency Ratio formula were $C^1 = 10.22$, $C^2 = 0.61$ and $C^3 = 0.11$.

In Example 1, the sheet was configured as in FIG. 2 and had a width to height ratio of 24:1. In Example 2, the sheet was configured as in FIG. 5 and had a width to height ratio of 9:1. In Example 3, the sheet was configured as in FIG. 4 and had a width to height ratio of 4:1. In Example 4, the sheet was configured as in FIG. 7 and had a width to height ratio of 2:1. In Example 5, the sheet was configured as in FIG. 8 and had a width to height ratio of 1:1.

Sorbency ratios for each of the various configurations were determined by placing two parallel rows of sorbent articles in a shallow pan with a dam at each end of the rows to create a central reservoir area in which the test liquid was maintained at about 0.32 cm depth for the duration of the test, i.e., until all articles were fully saturated. The sorbent articles were removed from the pan at the indicated times for weight determinations and subsequently returned to the pan to complete the test. Sorbency Ratio (SR) is calculated as follows:

$$SR = \frac{\text{saturated weight} - \text{original weight}}{\text{original weight}}$$

Sorbency ratios are reported in Tables 1-7.

Test liquids having various viscosities were used. Viscosities were determined according to ASTM Test Method D2983-87 at 25° C. using a Brookfield viscometer Type LVT. The test liquids included (a) MOBILMET S-122 cutting fluid (viscosity 0.5 cp, available from Mobil Oil Co.), (b) Aircraft hydraulic oil #15 (viscosity 14.1 cp, available from Texaco Refining and Marketing, Inc.)

(c) KLEAROL light mineral oil, Type NF, light (viscosity 17.5 cp, available from Witco Corp.), (d) TEXATHERM 46 hydraulic fluid (viscosity 72 cp, available from Texaco Refining and Marketing, Inc.), (e) DELVAC 1200 motor oil (viscosity 200 cp, available from Mobil Oil Corp.), (f) MOBILUBE 630 Lubricating oil (viscosity 540 cp, available from Mobil Oil Corp.), and (g) Multigear Lubricant EP SAE 85-140 (viscosity 820 cp, available from Texaco Refining and Marketing, Inc.).

TABLE 1

CUTTING FLUID SORBENCY RATIO

| Example | Time (min.) | | | | | |
|---|---|---|---|---|---|---|
| | 5 | 10 | 30 | 60 | 120 | 480 |
| 1a | 7.2 | 15.8 | 18.4 | 18.9 | 19.8 | 19.6 |
| 2a | 8.2 | 13.4 | 17.0 | 17.6 | 17.9 | 17.8 |
| 3a | 5.6 | 11.9 | 15.4 | 14.3 | 15.4 | 15.3 |

TABLE 2

HYDRAULIC OIL SORBENCY RATIO

| Example | Time (min.) | | | | |
|---|---|---|---|---|---|
| | 5 | 10 | 30 | 60 | 120 |
| 1b | 5.2 | — | 9.3 | 11.9 | 16.7 |
| 3b | 7.0 | — | 12.0 | — | 14.1 |
| 4b | 7.0 | — | 11.8 | — | — |

TABLE 3

MINERAL OIL SORBENCY RATIO

| Example | Time (min.) | | | | | | |
|---|---|---|---|---|---|---|---|
| | 5 | 10 | 30 | 60 | 120 | 480 | 1440 |
| 1c | 3.0 | 3.3 | 7.0 | 10.8 | 14.5 | 16.5 | 16.4 |
| 2c | 3.8 | 6.0 | 10.3 | 14.5 | 15.3 | 15.9 | 15.6 |
| 3c | 4.6 | 6.8 | 10.7 | 13.4 | 14.2 | 14.9 | 14.5 |
| 4c | 3.8 | 7.0 | 9.9 | 11.6 | 12.2 | 12.8 | 12.6 |
| 5c | 4.2 | 6.2 | 8.1 | 9.8 | 10.9 | 11.5 | 11.3 |

TABLE 4

HYDRAULIC FLUID SORBENCY RATIO

| Example | Time (min.) | | |
|---|---|---|---|
| | 120 | 480 | 1440 |
| 1d | 6.8 | 16.5 | 17.7 |
| 3d | 7.6 | — | — |
| 4d | 8.6 | — | — |

TABLE 5

MOTOR OIL SORBENCY RATIO

| Example | Time (min.) | | | | | |
|---|---|---|---|---|---|---|
| | 120 | 480 | 1440 | 2880 | 4320 | 8640 |
| 1e | 4.5 | 9.1 | 17.8 | — | — | — |

TABLE 5-continued

| | MOTOR OIL SORBENCY RATIO Time (min.) | | | | | |
|---|---|---|---|---|---|---|
| Example | 120 | 480 | 1440 | 2880 | 4320 | 8640 |
| 2e | 5.6 | 10.1 | 15.6 | 16.3 | 16.8 | — |
| 3e | 6.6 | 11.4 | 14.4 | 15.1 | 16.8 | — |
| 4e | 6.1 | 10.1 | 13.0 | 13.7 | 13.4 | — |
| 5e | 5.7 | 7.8 | 10.4 | 11.2 | 10.6 | — |

TABLE 6

| | LUBRICATING OIL SORBENCY RATIO Time (min.) | | | | | |
|---|---|---|---|---|---|---|
| Example | 120 | 480 | 1440 | 2880 | 4320 | 8640 |
| 1f | 4.7 | 8.2 | 10.9 | — | — | — |
| 3f | 4.5 | 8.3 | 13.2 | — | — | — |
| 4f | 5.3 | 10.0 | — | — | — | — |

TABLE 7

| | MULTIGEAR LUBRICATING SORBENCY RATIO Time (min.) | | | | | |
|---|---|---|---|---|---|---|
| Example | 120 | 480 | 1440 | 2880 | 4320 | 8640 |
| 1g | 3.3 | 5.8 | 7.9 | 11.2 | 13.1 | 17.9 |
| 2g | 3.6 | 6.3 | 8.7 | 12.2 | 14.6 | 16.2 |
| 3g | 3.4 | 6.6 | 9.0 | 13.0 | 14.3 | 15.0 |
| 4g | 3.9 | 7.3 | 9.5 | 12.8 | 13.2 | 13.7 |
| 5g | 2.9 | 7.4 | 8.5 | 9.0 | 10.2 | 11.0 |

As can be seen from the data in Tables 1-7, sorbent articles having fewer layers sorb lower viscosity fluids faster, while sorbent articles having a greater number of layers sorb higher viscosity fluids faster. Thus, one can readily select the number of layers for most efficient sorbency for a fluid with known viscosity and time using the Sorbency Ratio formula.

EXAMPLES 6-7

In Example 6, sheet material was prepared as in Example 1, folded as shown in FIG. 4 and lightly tacked at 15 cm intervals near the outer longitudinal fold lines to stabilize the folds. In Example 7, sheet material was prepared as in Example 1, folded as shown in FIG. 1 and lightly tacked at 15 cm intervals near the outer longitudinal fold lines to stabilize the folds. Each article was 2.3 cm high, 12 cm wide, and weighed about 32 g. Each sorbent article was tested for sorbency ratio (a) in its folded state, (b) partially folded state (FIG. 2) and (c) unfolded to form a single layer. Sorbency ratios were determined by placing the test article in a pan containing approximately 1.25 cm (0.5 in.) KLEAROL light mineral oil NF (viscosity 17.5 cps) removing the article from the pan at the indicated times and weighing the partially saturated article. Sorbency Ratio (SR) is calculated as in Examples 1-5. The results are set forth in Table 8.

TABLE 8

| | SORBENCY RATIO Time (min.) | | |
|---|---|---|---|
| Example | 10 | 30 | 60 |
| 6a | 6.0 | 11.5 | 12.4 |
| 6b | 4.8 | 9.8 | 11.3 |
| 6c | 4.3 | 6.4 | 7.9 |
| 7a | 6.9 | 12.6 | 12.6 |
| 7b | 5.7 | 7.9 | 10.6 |
| 7c | 4.0 | 5.8 | 7.2 |

The data in Table 8 demonstrates that for periods of time up to 60 minutes, sorbent sheet material configured as in FIG. 1 and FIG. 4 perform comparably.

EXAMPLE 8

A melt blown microfiber web was prepared according to U.S. Pat. No. 4,933,229 (Insley et al.) with 8% by weight TRITON X-100, nonionic surfactant. The web had a basis weight of 460 g/m$^2$, bulk density of 0.080 g/cm$^3$ and solidity of 8.6%. The web was folded to form a four layer configuration as shown in FIG. 4 and lightly tacked as in Example 6 to stablilize the folded configuration. Each article was 2 cm high, 12 cm wide, and weighed about 40 g. The constants for this material for the sorbency ratio formula were $C^1=2.77$, $C^2=0$, $C^3=0.05$. Each sorbent article was tested for sorbency ratio (a) in its folded state, (b) partially folded state (FIG. 2) and (c) unfolded to form a single layer. Sorbency ratios were determined as in Examples 6 and 7 except the fluids tested were mineral oil (viscosity 17.5 cps), TEXATHERM 46 hydraulic fluid (viscosity 72 cps) and 30W motor oil (viscosity 200 cps). The results are set forth in Tables 9-11.

TABLE 9

| | MINERAL OIL SORBENCY RATIO Time (hours) | | | | | | |
|---|---|---|---|---|---|---|---|
| Example | .5 | 1 | 2 | 4 | 8 | 24 | 48 |
| 8a | 1.8 | 3.1 | 3.9 | 5.9 | 8.3 | 9.8 | 10.5 |
| 8b | 2.9 | 5.0 | 6.3 | 8.0 | 9.1 | 9.8 | 10.1 |
| 8c | 5.7 | 8.4 | 8.8 | 8.9 | 8.9 | 8.9 | 9.1 |

TABLE 10

| | HYDRAULIC FLUID SORBENCY RATIO Time (hours) | | | | | | |
|---|---|---|---|---|---|---|---|
| Example | 1 | 2 | 4 | 8 | 24 | 48 | 72 |
| 8a | 1.2 | 1.9 | 2.7 | 3.5 | 5.8 | 9.6 | 10.2 |
| 8b | 3.0 | 4.2 | 5.1 | 6.4 | 8.5 | 9.5 | 9.5 |
| 8c | 3.7 | 5.1 | 7.4 | 8.2 | 8.5 | 8.9 | 8.6 |

TABLE 11

| | MOTOR OIL SORBENCY RATIO Time (hours) | | | | | | | | | |
|---|---|---|---|---|---|---|---|---|---|---|
| Ex. | 1 | 2 | 4 | 8 | 24 | 48 | 72 | 96 | 129 | 144 |
| 8a | 0.7 | 1.1 | 1.5 | 2.2 | 3.8 | 6.3 | 7.8 | 9.4 | 10.9 | 11.3 |
| 8b | 1.2 | 2.2 | 3.0 | 4.0 | 6.7 | 10.1 | 10.3 | 10.6 | 10.8 | 10.9 |
| 8c | 1.8 | 3.7 | 4.6 | 6.4 | 8.9 | 9.2 | 9.2 | 9.4 | 9.6 | 9.6 |

As can be seen from the data in Tables 9, 10 and 11, the folded product of the invention more efficiently sorbs more viscous fluid while the unfolded product more efficiently sorbs less viscous fluid. This can most clearly be seen at about one day sorption time.

EXAMPLE 9

A latex-bonded wood pulp web (SORBEX S-72, available from Matarah Industries, Milwaukee, Wis.) which had a basis weight of 172 g/m², a bulk density of 0.071 g/cm³ and a solidity of 6%, was folded to form a four layer configuration as shown in FIG. 4 and lightly tacked as in Example 6 to stablilize the folded configuration. Each article was 2 cm high, 12 cm wide, and weighed about 40 g. Each sorbent article was tested for oil sorbency (a) in its folded state, (b) partially folded state (FIG. 2) and (c) unfolded to form a single layer. The constants for this material for the Sorbency Ratio formula were $C^1=6.74$, $C^2=0$ and $C^3=0.11$. Oil sorbency was determined as in Example 6 and 7 except the fluids tested were KLEAROL light mineral oil (viscosity 17.5 cps), TEXATHERM 46 hydraulic fluid (viscosity 72 cps) and DELVAC 1200 motor oil (viscosity 200 cps). The results are set forth in Tables 12–14.

TABLE 12

MINERAL OIL SORBENCY RATIO

| Example | \multicolumn{7}{c}{Time (hours)} | | | | | | |
|---------|-----|-----|------|------|------|------|------|
|         | .5  | 1   | 2    | 4    | 8    | 24   | 48   |
| 9a      | 4.0 | 6.0 | 6.7  | 8.2  | 11.2 | 13.1 | 13.7 |
| 9b      | 6.9 | 10.4| 11.0 | 11.5 | 12.1 | 12.4 | 12.6 |
| 9c      | 8.1 | 9.6 | 9.7  | 9.7  | 9.8  | 9.9  | 10.1 |

TABLE 13

HYDRAULIC FLUID SORBENCY RATIO

| Example | \multicolumn{7}{c}{Time (hours)} | | | | | | |
|---------|-----|-----|------|------|------|------|------|
|         | 1   | 2   | 4    | 8    | 24   | 48   | 72   |
| 9a      | 1.8 | 2.7 | 3.8  | 5.7  | 8.3  | 12.0 | 12.7 |
| 9b      | 3.9 | 5.4 | 7.7  | 11.7 | 12.2 | 12.3 | 12.3 |
| 9c      | 5.6 | 8.5 | 10.8 | 10.9 | 11.1 | 11.2 | 11.1 |

TABLE 14

MOTOR OIL SORBENCY RATIO

| Ex. | \multicolumn{9}{c}{Time (hours)} | | | | | | | | |
|-----|-----|-----|-----|------|------|------|------|------|------|
|     | 1   | 2   | 4   | 8    | 24   | 48   | 72   | 96   | 129  | 144  |
| 9a  | 1.2 | 2.0 | 2.8 | 4.4  | 6.5  | 8.7  | 11.3 | 12.5 | 13.6 | 14.4 |
| 9b  | 2.0 | 3.5 | 5.2 | 7.5  | 11.7 | 13.5 | 13.8 | 14.0 | 14.1 | 14.1 |
| 9c  | 2.4 | 4.1 | 7.2 | 11.5 | 11.9 | 12.2 | 12.3 | 12.4 | 12.3 | 12.5 |

As can be seen from the data in Tables 12, 13 and 14, the folded product of the invention more efficiently sorbs more viscous fluid while the unfolded product more efficiently sorbs less viscous fluid. This can most clearly be seen at about one day sorption time.

Various modifications and alterations of this invention will become apparent to those skilled in the art without departing from the scope of the invention.

What is claimed is:

1. A liquid sorbent article comprising at least two contiguous layers formed from a single sheet, said layers being joined at a fold in said sheet and being intermittently releasably bonded together such that the area of the sheet contacted by bonding does not exceed about 5%; said article has a sorbency ratio, SR, such that $$SR = \sqrt[3]{T/V}\,(C^1 - C^2 H - C^3 W)$$

where SR is the sorbency ratio in grams liquid sorbed per gram sorbent;

T is the time in minutes for sorption of a given weight of liquid;

V is the viscosity in centipoise of the fluid being sorbed;

H is the height in centimeters of the sorbent article;

W is the width of the sorbent article;

$C^1$ is a constant dependent on the permeability $c^2$ is a geometric constant dependent on the height of the sorbent article; and $c^3$ is a geometric constant dependent on the width of the sorbent article.

2. The sorbent article of claim 1 wherein said article contains at least four layers.

3. The sorbent article of claim 1 wherein said article comprises microfibrous sheet materials.

4. The sorbent article of claim 3 wherein said microfibrous sheet materials comprise melt blown microfibers.

5. The sorbent article of claim 3 wherein said article further comprises sorbent particulate material.

6. The sorbent article of claim 4 wherein said sorbent particulate material comprises microfiber microwebs.

7. The sorbent article of claim 3 wherein said sheet materials further comprise surfactant.

8. The sorbent article according to claim 1 wherein said article has a substantially rectangular shaped cross-section.

9. The sorbent article according to claim 1 wherein said article has a width to height ratio of about 10:1 to about 1:1.

10. The sorbent article according to claim 1 wherein said article is capable of sorbing at least seven times its own weight of a light mineral oil over a period of 120 minutes.

11. The sorbent article according to claim 1 wherein at least an outer portion of said article further comprises an outer facing.

12. The sorbent article according to claim 11 wherein said outer facing is scrim.

13. The sorbent article according to claim 1 wherein said intermittent releasable bonding is by hot melt or pressure-sensitive adhesive, pressure sensitive tape, ultrasonic welding, pin bonding or mechanical bonding.

14. The sorbent article according to claim 1 wherein the area of said sheet contacted said bonding does not exceed about 5%.

* * * * *

UNITED STATES PATENT AND TRADEMARK OFFICE
CERTIFICATE OF CORRECTION

PATENT NO. : 5,256,466
DATED : October 26, 1993
INVENTOR(S) : Michael R. Berrigan and Harold J. Seppala It is certified that error appears in the above-indentified patent and that said Letters Patent is hereby corrected as shown below:

On the title page,
[75] Inventors     "Berringan" should be -- Berrigan --

Col. 12, line 14   "c²" should be -- $C^2$ --

Col. 12, line 15   "c³" should be -- $C^3$ --

Signed and Sealed this

Third Day of May, 1994

Attest:

BRUCE LEHMAN

Attesting Officer     Commissioner of Patents and Trademarks